United States Patent [19]
Florence

[11] Patent Number: 5,313,479
[45] Date of Patent: May 17, 1994

[54] SPECKLE-FREE DISPLAY SYSTEM USING COHERENT LIGHT

[75] Inventor: James M. Florence, Richardson, Tex.

[73] Assignee: Texas Instruments Incorporated, Dallas, Tex.

[21] Appl. No.: 921,869

[22] Filed: Jul. 29, 1992

[51] Int. Cl.⁵ ............................................. H01S 3/10
[52] U.S. Cl. ................................. 372/26; 372/9; 372/98
[58] Field of Search ............... 372/26, 9, 28, 99, 108

[56] References Cited
U.S. PATENT DOCUMENTS
4,922,502  5/1990  Unternattrer et al. ............... 372/15

Primary Examiner—Léon Scott, Jr.
Attorney, Agent, or Firm—Julie L. Reed; James C. Kesterson; Richard L. Donaldson

[57] ABSTRACT

A speckle-free display system using coherent light is disclosed. The light is directed through a spinning diffusing element to illuminate a spatial light modulator. The spinning element is operable to move the interference patterns around the screen at a speed where it is undetectable to the human eye. The diffusing element is more than likely comprised of ground glass.

15 Claims, 2 Drawing Sheets

SPECKLE-FREE DISPLAY SYSTEM USING COHERENT LIGHT

BACKGROUND OF THE INVENTION

1. Field of the Invention

This invention relates to display systems, more particularly to display systems using coherent light sources.

2. Background of the Invention

Laser illumination in displays has many advantages of standard lighting schemes, especially in color displays. Lasers produce high power light with good color purity. The mixture of red, green, and blue, laser light can be achieved relatively simply by standard optical components, including fold mirrors. Unfortunately, the use of one laser causes an interference problem, and that problem is compounded with the use of more than one laser.

Because each laser is coherent, having a continuous relationship between phases, when lasers are diffused using beam splitters and lens systems, the phase pattern results in a particular pattern of interference called speckle. A speckled picture cannot be viewed very clearly, if at all, since the interference patterns often cancel each other, resulting in a noisy, blurry picture. Putting three lasers together increases this problem to the point that the noise almost completely eliminates the desired picture.

Lasers are desirable for use with spatial light modulators, which normally have relatively small active areas, because of the increased illumination power. Many attempts have been made to overcome the speckle problem such as vibrating screens, acoustic waves, and very complex optical schemes of many components. These ideas result in very high costs, or extremely complex systems. Therefore, there exists a need for a low cost, simple solution that eliminates laser speckle in displays.

SUMMARY OF THE INVENTION

The present invention disclosed herein comprises a speckle-free laser display system using spatial light modulators. The display system is illuminated by one, or a combination of, lasers that are controlled by some type of shutter allowing them to be turned off or on. As the laser or the laser mix comes together to be directed onto either the spatial light modulator or the beam, it passes through a spinning diffusion element. This diffusion element causes the speckle pattern to move around on the screen such that the viewer's eyes do not register the speckle at all, resulting in a clear, colorful picture.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
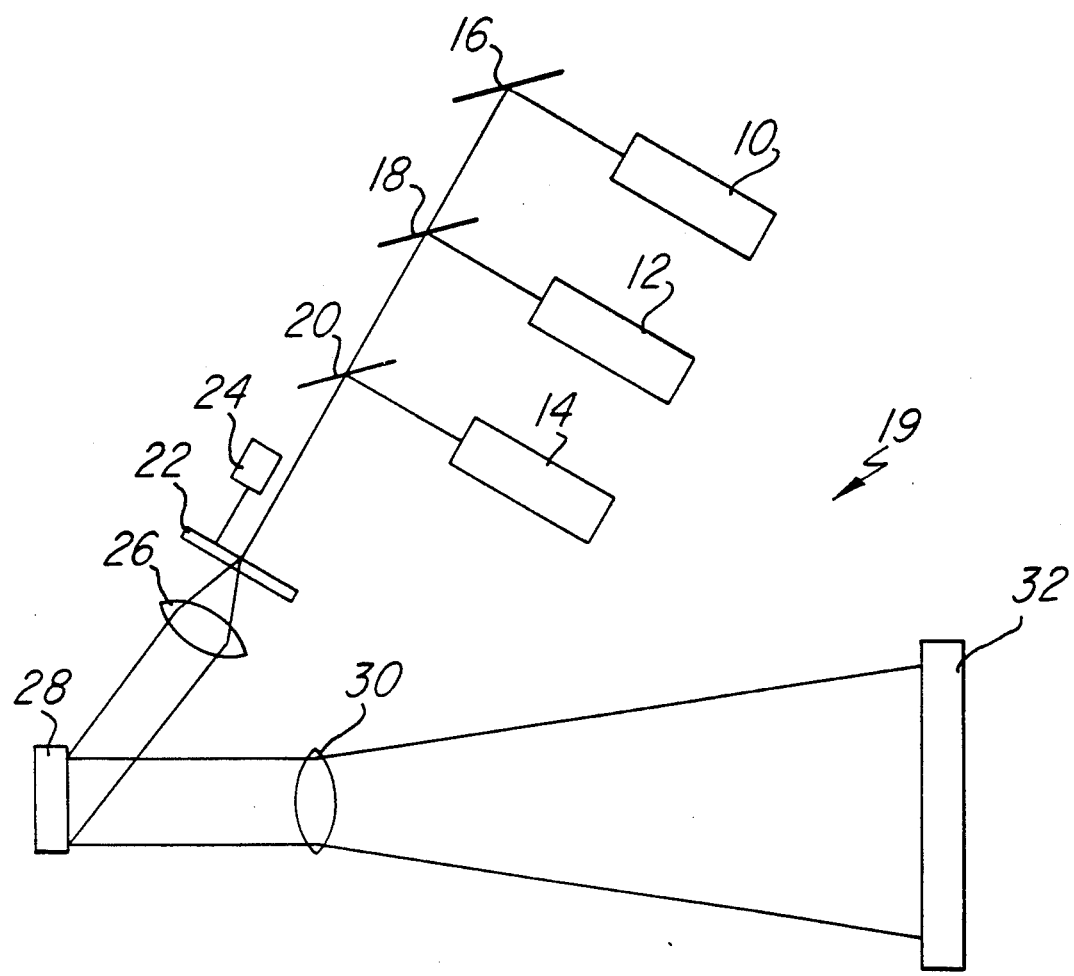
FIG. 1 shows a coherent light display system with a diffusion element.

In FIG. 1, the illumination system for a spatial light modulator display is shown. The source in this embodiment consists of three coherent light sources, probably lasers, one red 10, one blue 12, and one green 14, sequentially gated to produce a full-color display. Another possible source could be a tunable laser capable of producing all three colors as it is tuned. For example, if laser 14 is selected to be a tunable laser, and element 20 is a mirror, then lasers 12 and 10 and their subsystems can be eliminated as indicated at dashed line 19. The different colored lasers are combined using dichroic beam-splitters, which pass light of one color while reflecting light of another color. Element 16 could be a dichroic beam-splitter that reflects red light from laser 10 or a mirror, and dichroic beam-splitter 18 passes red light while reflecting blue light from laser 12. Similarly, dichroic beam splitter 20 passes all light but green light, which is reflected from laser 14. Another possible option would be half-silvered mirrors, which would reflect light from the laser side and pass light from the other. The beam then passes through the diffusion element 22, which is powered by a coil or motor 24, causing the element to spin.

The previous inventions have used a lens or diffusing elements 26 to merely widen the beam to more fully illuminate the spatial light modulator 28. This, as discussed previously in the background, does not eliminate speckle caused by interference patterns of the coherent light. If the diffusing element is mounted on an axle, and spun prior to the lens 26 which focuses the light onto the spatial light modulator, the speckle appears to vanish at the viewing surface 32. Another possibility is that the diffusing element could be vibrated. The viewing surface 32 receives light that is transformed into an image by spatial light modulator 28. The viewer or viewing system could be to either side of the viewing surface 32. The spatial light modulator in this embodiment is a reflective modulator, such as a digital micromirror device (DMD, or deformable mirror device), or a liquid crystal operated in the reflective mode. The diffusing element works as well for transmissive modulators, such as various ferroelectric and liquid crystal cells.

The speckle is still present, but the moving diffusion element disrupts the interference patterns such that these patterns, or speckle, move around on the screen. If the diffusing element is rotated or vibrated quickly enough, the speckle seems to disappear. The driving force behind this phenomenon is the human eye's integration time for moving pictures. If the speckle moves faster than the eye can detect it, it seems to disappear.

Experimentation was performed using the above embodiment rotating the element from 1revolutions per minute (rpm), to approximately 100 rpm. It was found that the speckle vanished for all spectators in the range of 30–40 rpm. The inventor found that spinning the element at 100 rpm provided no additional benefit, and merely used more power.

Figures 2, 3A, 3B:
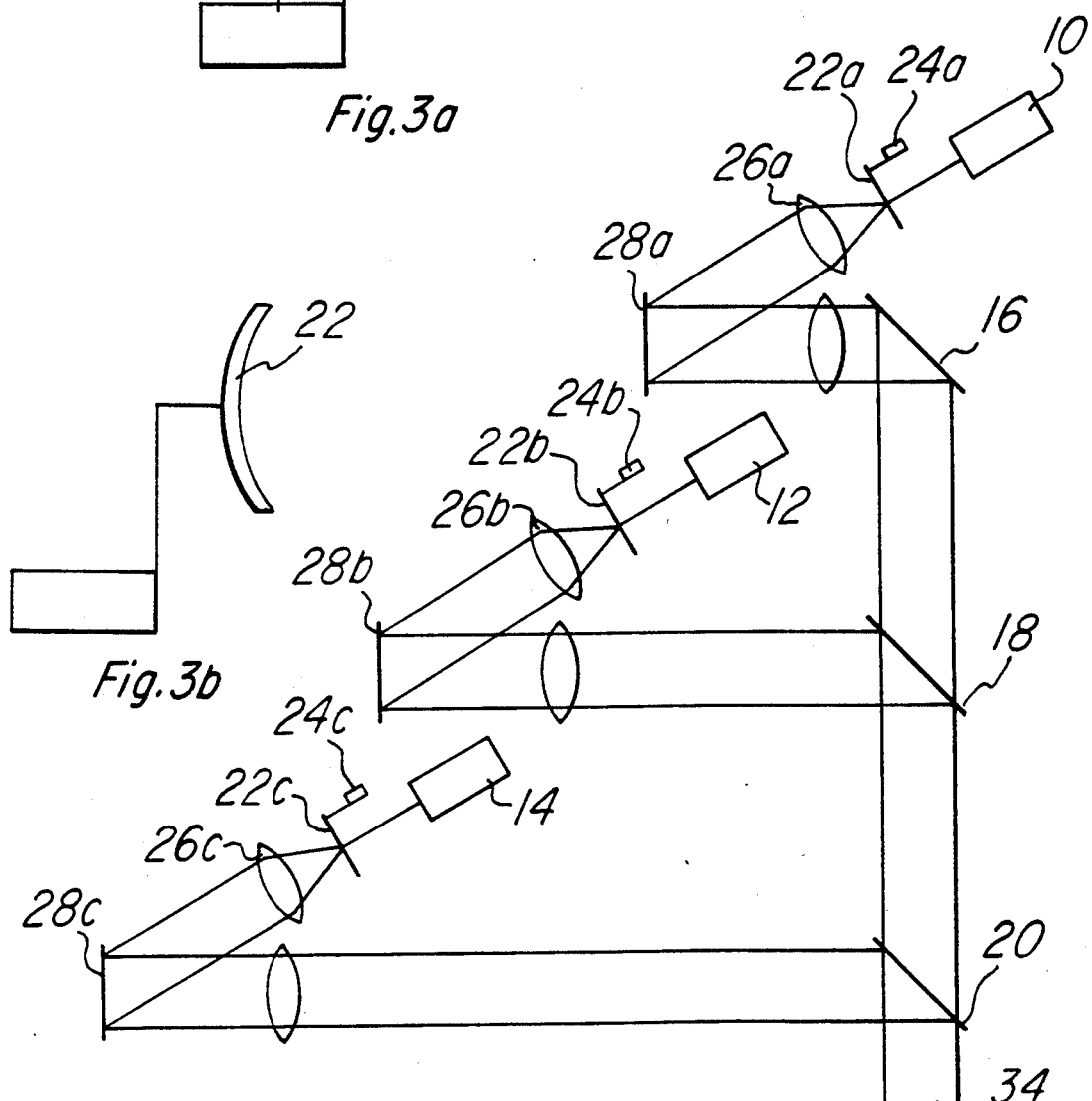
FIG. 2 shows an alternate embodiment of a coherent light display system.
FIGS. 3A and 3B show possible embodiments of diffusion elements.

FIG. 2 shows an alternative method for achieving a speckle-free display. Each light source has its own diffusing element and spatial light modulator. For example, coherent red source 10 has diffusing element 22A, with motor or coil 24A, focusing lens 26A, and spatial light modulator 28A. The resultant red image is transmitted to dichroic beam splitter 16. The coherent light from blue and green lasers 12 and 14 is then similarly processed as indicated by diffusing elements 22B and 22C, motors or coils 24B and 24C, focusing lenses 26B and 26C and spatial light modulators 28B and 28C. In this manner the coherent light sources for red, green and blue, can be more easily run in parallel, rather than sequentially as shown in FIG. 1. The final image at point 34 is then projected onto a viewing surface.

FIGS. 3A and 3B show different possibilities for the diffusing element. FIG. 3A shows a side view of an element 22, with its attached motor or coil 24. In FIG. 3A it is assumed that the element has no gain. The light transmitted from the side away from the spatial light modulator passes through the diffusing element in a Lambertian pattern, where the light is spread equally in all directions. The element 22 of FIG. 3B, has a gain, caused by the curve of the element. Light in this would pass through the element such that it would be more concentrated towards the middle of the curve. The gain of the element more fully fills the numerical aperture of the lens used to focus the light onto the spatial light modulator, allowing a more optically efficient system. Either element is made of a diffusing material, such as ground glass, that is more than likely transparent, and can be any shape.

Thus, although there has been described to this point particular embodiments of a speckle-free display using coherent light it is not intended that such specific references be considered as limitations upon the scope of this invention except in-so-far as set forth in the following claims.

What is claimed is:

1. A speckle-free display system comprising:
   a. at least one coherent light source generating at least one coherent light beam;
   b. a diffusing element located in a plane intercepts said coherent light beam such that light leaves said diffusing element as a diffused light beam which includes interference patterns;
   c. a means for moving said diffusing element in said plane while said diffusing element is intercepting said coherent light beam;
   d. a spatial light modulator for receiving said diffused light beam and for generating an image light beam; and
   e. a viewing surface located such that said image bearing light beam impinges thereon to produce a visible image, and wherein said movement of said diffusing element causes said speckle interference pattern to move on said viewing surface so that said speckle pattern is substantially and thereby an improved image is provided.

2. The system as claimed in claim 1 wherein said at least one coherent light source further comprises three lasers, one red, one green and one blue.

3. The system as claimed in claim 1 wherein said at least one coherent light source further comprises a tunable laser.

4. The system as claimed in claim 1 wherein said diffusing element has no gain.

5. The system as claimed in claim 1 wherein said diffusing element has a gain.

6. The system as claimed in claim 1 wherein said diffusing element is comprised of ground glass.

7. The system as claimed in claim 1 wherein said means for moving is a motor.

8. The system as claimed in claim 1 wherein said means for moving is a coil.

9. The system as claimed in claim 1 wherein said diffusing element is rotated.

10. The system as claimed in claim 1 wherein said diffusing element is rotated at more than 40 rpm.

11. The system as claimed in claim 1 wherein said diffusing element is vibrated.

12. The method of producing a speckle-free display comprising:
    a. providing at least one coherent light beam;
    b. providing a diffusing element to intercept said at least one coherent light beam such that light leaves said diffusing element as a widened beam of light, said widened beam of light containing interference patterns;
    c. moving said diffusing element while said diffusing element is intercepting said at least one coherent light beam such that said interference patterns move within said widened beam of light;
    d. modulating said widened coherent light beam with a spatial light modulator to form an image bearing light beam; and
    e. locating a viewing surface such that said image bearing light beam impinges thereon and produces a visible image, and wherein movement of said diffusing element causes speckle interference patterns to move on said viewing surface so that said speckle patterns are substantially invisible.

13. The method of claim 12 wherein said moving step comprises rotating said diffusing element.

14. The method of claim 12 wherein said moving step comprises rotating said diffusing element at a more than 40 rpm.

15. The method of claim 12 wherein said moving step comprises vibrating said diffusing element.

* * * * *